(12) United States Patent
Ishii et al.

(10) Patent No.: US 11,093,670 B2
(45) Date of Patent: Aug. 17, 2021

(54) HOT-DIP COATING EQUIPMENT INCLUDING COOLING RATE DETERMINING DEVICE, AND INFORMATION PROCESSING PROGRAM

(71) Applicants: NIPPON STEEL NISSHIN CO., LTD., Tokyo (JP); NS Wheeling-Nisshin, Inc., Follansbee, WV (US)

(72) Inventors: Koutarou Ishii, Tokyo (JP); Shinya Furukawa, Tokyo (JP); Shinichi Koga, Tokyo (JP); Yasunori Hattori, Tokyo (JP); Patrick Edward Pendleton, Follansbee, WV (US); Kazuhiro Yamada, Follansbee, WV (US)

(73) Assignees: NIPPON STEEL NISSHIN CO., LTD., Tokyo (JP); NS Wheeling-Nisshin, Inc., Follansbee, WV (US)

( * ) Notice: Subject to any disclaimer, the term of this patent is extended or adjusted under 35 U.S.C. 154(b) by 0 days.

(21) Appl. No.: 16/739,456

(22) Filed: Jan. 10, 2020

(65) Prior Publication Data
US 2020/0226306 A1    Jul. 16, 2020

Related U.S. Application Data

(60) Provisional application No. 62/791,178, filed on Jan. 11, 2019.

(51) Int. Cl.
G06F 30/20    (2020.01)
C23C 2/12    (2006.01)
(Continued)

(52) U.S. Cl.
CPC .............. *G06F 30/20* (2020.01); *C22C 21/02* (2013.01); *C23C 2/12* (2013.01); *G06F 2111/10* (2020.01); *G06F 2119/08* (2020.01)

(58) Field of Classification Search
CPC .. G06F 30/20; G06F 2119/08; G06F 2111/10; C22C 21/02; C23C 2/12
See application file for complete search history.

(56) References Cited

U.S. PATENT DOCUMENTS 6,017,643 A * 1/2000 Kobayashi ................ C23C 2/12
118/407
6,610,422 B1 * 8/2003 Ooi ........................ B05D 7/546
148/530
(Continued)

FOREIGN PATENT DOCUMENTS

JP    2002-180228 A    6/2002
JP    2004-068075 A    3/2004
(Continued)

OTHER PUBLICATIONS

Le, Q.C. and Cui, J.Z., 2008. Investigation on colourisation regularity of colouring hot dip galvanisation processing. Surface engineering, 24(1), pp. 57-62. (Year: 2008).*
(Continued)

*Primary Examiner* — Chuen-Meei Gan
(74) *Attorney, Agent, or Firm* — Mintz Levin Cohn Ferris Glovsky and Popeo, P.C.; Steven M. Jensen

(57) ABSTRACT

A hot-dip coating equipment includes a cooling rate determining device that includes: a coefficient obtaining section configured to obtain coefficients α, β, γ, and δ associated with the hot-dip coating bath, in the following equation that expresses a degree of discoloration YI of the surface of a hot-dip coated steel sheet; and a rate determining section configured to determine an average cooling rate A so as to allow the YI of the following Expression (1) to be not more
(Continued)

than a predetermined reference value, $YI = (\alpha \times [SE] + \beta) \times \{(T-ST)/A\}^{1/2} + \gamma \times [SE] + \delta \ldots (1)$, where: [SE] is a concentration (mass %) of a specific element contained in the hot-dip coating bath; T is a temperature (° C.) of the hot-dip coating bath; and ST is a solidification temperature (° C.) at which the hot-dip coating bath is solidified.

6 Claims, 2 Drawing Sheets

(51) Int. Cl.
  *C22C 21/02* (2006.01)
  *G06F 119/08* (2020.01)
  *G06F 111/10* (2020.01)

(56) References Cited

U.S. PATENT DOCUMENTS

| | | |
|---|---|---|
| 2002/0058154 A1 | 5/2002 | Friedersdorf et al. |
| 2002/0136920 A1 | 9/2002 | McDevitt et al. |
| 2003/0113575 A1 | 6/2003 | McDevitt |
| 2004/0161629 A1 | 8/2004 | McDevitt |
| 2005/0181229 A1 | 8/2005 | McDevitt et al. |
| 2007/0068682 A1 | 3/2007 | McKinlay |
| 2007/0181314 A1 | 8/2007 | McKinlay |
| 2017/0114436 A1 | 4/2017 | Furukawa et al. |
| 2019/0078189 A1 | 3/2019 | Furukawa et al. |

FOREIGN PATENT DOCUMENTS

| | | |
|---|---|---|
| JP | 2004-115908 A | 4/2004 |
| JP | 2005-256050 A | 9/2005 |
| JP | 3751879 B2 | 12/2005 |
| JP | 2006-22409 A | 1/2006 |
| JP | 5591414 B1 | 9/2014 |
| JP | 6069558 B1 | 2/2017 |
| JP | 2018-104762 A | 7/2018 |

OTHER PUBLICATIONS

Levai, Gabor, "Designing the color of hot-dip galvanized steel sheet through destructive light interference using a Zn—Ti liquid metallic bath." Metallurgical and Materials Transactions A 47, No. 7, 2016 (Year: 2016).*

International Search Report dated Feb. 18, 2020 in corresponding International Application No. PCT/JP2020/000671.

* cited by examiner

HOT-DIP COATING EQUIPMENT INCLUDING COOLING RATE DETERMINING DEVICE, AND INFORMATION PROCESSING PROGRAM

TECHNICAL FIELD

The present invention relates to, for example, a device for determining a cooling rate of a molten coating material-coated steel sheet which is taken out of a hot-dip coating bath, in production of a hot-dip coated steel sheet. More specifically, the present invention relates to, for example, a device for determining a cooling rate of a molten coating material-coated steel sheet, which device is capable of preventing discoloration of a surface of a hot-dip coated steel sheet after hot-dip coating.

BACKGROUND ART

Conventionally, various hot-dip coated steel sheets are produced by various hot-dip coatings to steel sheets. In order to improve the quality of a product (hot-dip coated steel sheet) thus produced, various techniques are used in accordance with types of hot-dip coating (i.e., compositions of hot-dip coating baths).

One example of such a hot-dip coated steel sheet is a steel sheet hot-dip coated with an aluminum-based coating material (hot-dip aluminized steel sheet). The hot-dip aluminized steel sheet is a coated steel sheet obtained by coating a surface of a steel sheet with a coating material which contains aluminum (Al) as a main component, by a hot-dip method so that the steel sheet can have higher corrosion resistance and/or higher heat resistance. Such a hot-dip aluminized steel sheet has been widely used mainly for members that are required to have heat resistance, such as exhaust gas members of automobiles and members of combustion devices.

Note that the hot-dip aluminized steel sheet has a coating layer having a surface on which a spangle pattern appears, the spangle pattern being formed due to dendrites, which are structures obtained by solidification of aluminum. The spangle pattern is a characteristic geometric pattern or a flower pattern, and each region (i.e., spangle) of the spangle pattern is constituted by dendrites.

A spangle grows during solidification of aluminum after coating. Growth of the spangle progresses as below. First, the nucleus of the spangle (i.e., spangle nucleus) occurs. Then, a primary dendrite arm grows from the spangle nucleus. Subsequently, a secondary dendrite arm develops from the primary dendrite arm. Growth of such dendrite arms stops due to a collision between adjacent spangles. It follows that presence of more spangle nuclei in the coating causes an increase in number of spangles. This causes each spangle to have a minute size.

The presence of such a spangle does not adversely affect a quality (e.g., corrosion resistance) of the hot-dip aluminized steel sheet. Note, however, that in the market, a hot-dip aluminized steel sheet is preferred which has spangles having a minute size and thus has a surface skin having an inconspicuous spangle pattern.

The degree of reduction in spangle size can be evaluated on the basis of the number of spangles per unit area, that is, a spangle density. A greater spangle density means a larger number of spangles per unit area and thus spangles having a minute size.

Under the circumstances, the following method is proposed, for example: a method of producing a hot-dip aluminized-galvanized steel sheet which includes a coating layer made of an aluminum-zinc alloy, the method involving, for the purpose of formation of fine spangles, adding titanium (Ti), zirconium (Zr), niobium (Nb), boron (B), a boride such as aluminum boride ($AlB_2$ or $AlB_{12}$), titanium carbide (TiC), titanium boride ($TiB_2$), and/or titanium aluminide ($TiAl_3$) to a coating bath so that more substances acting as spangle nuclei are obtained. Such a method is disclosed in, for example, Patent Literatures 1 to 3.

CITATION LIST

Patent Literature

[Patent Literature 1]
Japanese Patent Application Publication Tokukai No. 2004-115908 (Publication date: Apr. 15, 2004)
[Patent Literature 2]
Japanese Patent Application Publication Tokukai No. 2006-22409 (Publication date: Jan. 26, 2006)
[Patent Literature 3]
Japanese Patent No. 3751879 (Publication date: Dec. 16, 2005)
[Patent Literature 4]
Japanese Patent No. 5591414 (Publication date: Sep. 17, 2014)
[Patent Literature 5]
Japanese Patent No. 6069558 (Publication date: Feb. 1, 2017)
[Patent Literature 6]
Japanese Patent Application Publication Tokukai No. 2018-104762 (Publication date: Jul. 5, 2018)

SUMMARY OF INVENTION

Technical Problem

Note, however, that use of the above method to produce a hot-dip aluminized steel sheet has the following problems.
Specifically, since aluminum (having a specific gravity of 2.7) is a relatively lightweight metal, an Al-based hot-dip coating bath containing molten aluminum as a main component is a little lower in specific gravity than an aluminum-zinc coating bath, which is a mixture of aluminum and zinc (having a specific gravity of 7.1). Thus, any of substances, such as Ti, Nb, titanium carbide (TiC), titanium boride ($TiB_2$), and titanium aluminide ($TiAl_3$), which are higher in specific gravity than the Al-based hot-dip coating bath, easily precipitates at the bottom of the Al-based hot-dip coating bath, so that it is difficult for such a substance to be uniformly dispersed in the Al-based hot-dip coating bath. On this account, the methods disclosed in Patent Literatures 1 to 3 have a problem of difficulty in stable formation of fine spangles on surfaces of hot-dip aluminized steel sheets which are continuously produced as in an industrial continuous operation.

Patent Literature 4 discloses a hot-dip aluminized steel sheet in which the B content of its coating layer is 0.002 mass % to 0.080 mass %. Note, however, that according to the technique disclosed in Patent Literature 4, B, which is unevenly distributed over a surface of the coating layer of the hot-dip aluminized steel sheet, allows the coating layer to be more slidable against a mold, and consequently allows the coating layer to be more resistant to galling. It follows that Patent Literature 4 fails to disclose that fine spangles are formed on a surface of a hot-dip aluminized steel sheet, and no special effect of reducing spangle size is obtained.

Patent Literatures 5 and 6 disclose techniques to form fine spangles on a surface of a hot-dip aluminized steel sheet by controlling both the average B concentration and the average potassium (K) concentration of a coating to fall within predetermined ranges. According to the techniques, it is possible to enhance the additive elements' spangle-size-reducing effect as compared to cases where B or K alone is added to the coating layer of the hot-dip aluminized steel sheet. Such techniques disclosed in Patent Literatures 5 and 6 may solve, to a certain extent, the problem that substances acting as spangle nuclei precipitate at the bottom of a coating bath, since the difference in specific gravity between the substances and a molten aluminum (Al) bath is relatively small.

The inventors of the present invention so far has found that the following phenomenon occurs in cases where the techniques disclosed in Patent Literatures 5 and 6 are each used. Specifically, in a case where the technique disclosed in Patent Literature 5 or 6 is used, the spangle density of a hot-dip aluminized steel sheet may be unstable and the surface of the hot-dip aluminized steel sheet after hot-dip coating may discolor (to a color range of brown to gold). Such discoloration does not adversely affect the performance of the hot-dip aluminized steel sheet. However, a hot-dip aluminized steel sheet having a white surface is preferred in the market. Therefore, discoloration of the surface of a hot-dip aluminized steel sheet lowers the product value of the hot-dip aluminized steel sheet.

Further, the phenomenon (discoloration) as described above may possibly occur also in the case of other kinds of hot-dip coated steel sheet as well as the hot-dip aluminized steel sheet. In other words, discoloration of the surface of the hot-dip coated steel sheet may easily occur after hot-dip coating, depending on constituent components of a hot-dip coating bath.

In view of the above-described matters, an object of the present invention is to prevent discoloration of a surface of a hot-dip coated steel sheet after hot-dip coating.

Solution to Problem

In order to solve the above problem, a cooling rate determining device in accordance with an aspect of the present invention is a cooling rate determining device for determining a cooling rate of a molten coating material-coated steel sheet, the molten coating material-coated steel sheet being a substrate steel sheet which is taken out of a hot-dip coating bath and to which a molten coating material adheres, the cooling rate determining device including: a coefficient obtaining section configured to obtain coefficients $\alpha$, $\beta$, $\gamma$, and $\delta$ associated with the hot-dip coating bath, in the following Expression (1) which expresses a degree of discoloration YI of a surface of a hot-dip coated steel sheet obtained by cooling the molten coating material-coated steel sheet; and a rate determining section configured to determine an average cooling rate in a time period from immediately after taking the molten coating material-coated steel sheet out of the hot-dip coating bath until completion of solidification of the molten coating material adhering to the substrate steel sheet, the rate determining section determining the average cooling rate so as to allow the YI to be not more than a predetermined reference value, the YI being obtained by substituting the coefficients in the following Expression (1), $$YI=(\alpha \times [SE]+\beta) \times \{(T-ST)/A\}^{1/2}+\gamma \times [SE]+\delta \qquad (1),$$

where:

[SE] is a concentration (mass %) of a specific element which is specified in advance among constituent elements of the hot-dip coating bath;

T is a temperature (° C.) of the hot-dip coating bath;

ST is a solidification temperature (° C.) at which the hot-dip coating bath is solidified.

A is the average cooling rate (° C./second); and $\alpha$, $\beta$, $\gamma$, and $\delta$ are the coefficients.

Advantageous Effects of Invention

An object of an aspect of the present invention is to prevent discoloration of a surface of a hot-dip coated steel sheet after hot-dip coating.

DESCRIPTION OF EMBODIMENTS

Figure 1:
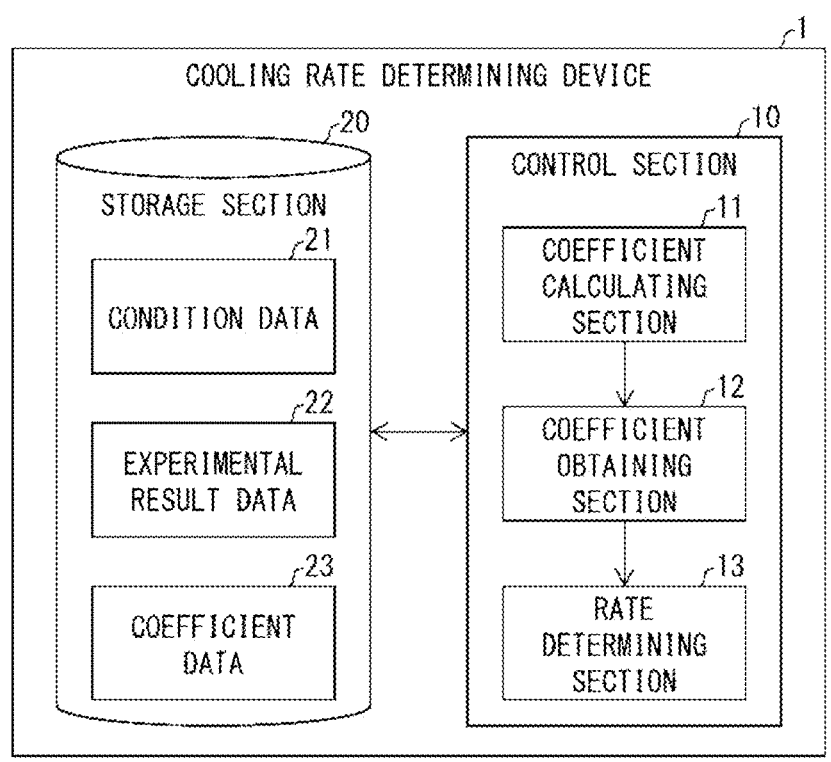
FIG. 1 is a block diagram schematically illustrating a configuration of a cooling rate determining device in accordance with an embodiment of the present invention.

The following description will discuss an embodiment of the present invention. Note that, unless otherwise specified, the present invention is not limited to the following description, which is provided so that subject matters of the present invention are better understood. Note also that an expression "A to B" as used herein means "not less than A and not more than B", unless otherwise noted. In addition, note that "%" as used herein to describe a composition means "% by mass (mass %)" unless otherwise noted.

1. Definitions of Terms

The term "steel sheet" as used herein includes a steel strip. The term "molten coating material-coated steel sheet" herein means a substrate steel sheet having a surface to which part of a hot-dip coating bath in a molten state adheres, which substrate steel sheet is taken out of the hot-dip coating bath after having been dipped in and passed through the hot-dip coating bath. When the molten coating material-coated steel sheet is cooled, a substance on the surface of the substrate steel sheet is solidified, so that a hot-dip coating layer is formed on the substrate steel sheet. As a result, a hot-dip coated steel sheet is produced.

The term "solidification time" means a time period from immediately after taking the molten coating material-coated steel sheet out of the hot-dip coating bath to a time point at which formation of the hot-dip coating layer is completed as a result of solidification of the substance on the surface of the substrate steel sheet. How to determine the time point at which formation of the hot-dip coating is completed is not particularly limited to a specific method. That time point can be determined, for example, on the basis of a change in surface gloss which is visually observable to a person.

The "solidification time" can be calculated as follows. Specifically, first, a transfer distance is calculated, on the basis of (i) a position of the surface of the hot-dip coating bath in a continuous hot-dip coating equipment line and (ii) a position at which the hot-dip coating is formed in the continuous hot-dip coating equipment line. Then, the "solidification time" can be calculated by dividing the transfer distance by a transfer speed of that equipment line.

The term "average cooling rate" means an average value of cooling rate (e.g., a change in temperature per second) of the molten coating material-coated steel sheet in a time period from immediately after taking the molten coating material-coated steel sheet out of the hot-dip coating bath to the time point at which formation of the hot-dip coating layer is completed as a result of solidification of the substance on the surface of the substrate steel sheet. The "average cooling rate" (for example, in the unit of ° C./second) can be obtained by, for example, a calculation of {(first temperature−second temperature)/solidification time}, where the first temperature is a temperature immediately after taking out the molten coating material-coated steel sheet out of the hot-dip coating bath (a temperature which can approximate the temperature of the hot-dip coating bath) and the second temperature is a solidification temperature of a constituent substance of the hot-dip coating bath.

2. Schematic Description of Findings Based on which Present Invention was Made

The following briefly describes the findings of the inventors of the present invention together with how the inventors of the present invention obtained the findings.

The inventors of the present invention recently obtained a technique to produce a hot-dip aluminized steel sheet with fine spangles by adding a combination of B and K to the coating bath within predetermined ranges of concentration (see Patent Literature 5). Note here that the hot-dip aluminized steel sheet is one kind of hot-dip coated steel sheet. Trial use of this technique for industrial production has resulted in the following phenomenon.

Specifically, the inventors of the present invention produced a hot-dip aluminized steel sheet at a surface of which an Al-based hot-dip coating layer was formed by using an Al-based hot-dip coating bath to which a combination of B and K had been added. The Al-based hot-dip coating layer was formed here by cooling a substrate steel sheet, which had been dipped in and passed through the Al-based hot-dip coating bath and then taken out of the Al-based hot-dip coating bath. In some cases, the hot-dip aluminized steel sheet thus produced had a discolored surface. For example, such discoloration of the surface of the hot-dip aluminized steel sheet resulted in a patchy pattern. In some other cases, the entire surface of the hot-dip aluminized steel sheet discolored.

In order to figure out a cause of the discoloration, the inventors of the present invention analyzed a discolored portion and a normal portion, which had not discolored, of the hot-dip aluminized steel sheet, by a glow discharge optical emission spectrometry (GDS). As a result, the inventors found that in the discolored portion, an oxygen-concentrated layer (a so-called oxide layer) present at the surface of an Al-based coating layer was formed relatively thicker than that in the normal portion. A reason for this is still unclear, but it is inferred that the discoloration occurred due to a phenomenon in which since an oxide film formation speed increased because of, for example, addition of B in the Al-based hot-dip coating bath, a relatively thicker oxide layer was formed.

Note that a degree of discoloration of the surface of the hot-dip aluminized steel sheet can be evaluated by a yellowness index YI. How to derive the yellowness index YI can be understood with reference to, for example, the description of JIS K7373.

As a result of further studies of the inventors of the present invention, it was found that there exists a proportional relation expressed by the following Expression (2) between the yellowness index YI and the oxide layer. This was derived from investigation of a correlation between the yellowness index YI and the oxide layer by organizing various experimental data regarding the yellowness index YI and the oxide layer.

$$YI = a \times x + b \quad (2),$$

where:
x is a thickness of the oxide layer; and
a and b are constants.

In a surface layer of the molten coating material-coated steel sheet to which the Al-based hot-dip coating bath adheres, an oxide is formed at a speed (i.e., a formation speed of the oxide layer in a thickness direction of the hot-dip aluminized steel sheet) which is controlled by a speed of diffusion of oxygen that is derived from atmospheric air permeating into the oxide layer. In light of this, when t represents a time period from taking the substrate steel sheet out of the coating bath until completion of formation of the coating in an air atmosphere ("solidification time" described above), x and t have a relation expressed by the following Expression (3):

$$x = k \times t^{1/2} \quad (3),$$

where k is a diffusion coefficient.

Accordingly, with regard to the yellowness index YI, the above Expression (2) can be transformed to the following Expression (4):

$$YI = a \times k \times t^{1/2} + b \quad (4).$$

Further, the inventors of the present invention investigated a relation between the yellowness index YI and a B concentration of the bath, assuming that the above t is a constant. As a result of further investigation by the inventors, it was found that there exists a proportional relation expressed by the following Expression (5) between the yellowness index YI and the B concentration of the bath:

$$YI = X_1 \times [B] + X_2 \quad (5),$$

where:
[B] is a B concentration (mass %) in the Al-based hot-dip coating bath; and
$X_1$ and $X_2$ are constants.

The values of $X_1$ and $X_2$ in the above Expression (5) are uniquely defined depending on t. Accordingly, the Expression (5) can be generalized as the following Expression (6) where the above $X_1$ and $X_2$ are expressed, in functions of t, as $X_1(t)$ and $X_2(t)$.

$$YI = X_1(t) \times [B] + X_2(t) \quad (6).$$

As shown in the above Expression (4), YI is a function of $t^{1/2}$. Accordingly, $X_1(t)$ can be expressed by the following Expression (7), and $X_2(t)$ can be expressed by the following Expression (8).

$$X_1(t) = \alpha \times t^{1/2} + \gamma \quad (7)$$

$$X_2(t) = \beta \times t^{1/2} + \delta \quad (8)$$

Here, α, β, γ, and δ are each a constant.

The yellowness index YI can be expressed by the following Expression (9), by substituting the above Expressions (7) and (8) in the above Expression (6). The above α, β, γ, and δ are coefficients in the Expression (9) below.

$$YI = (\alpha \times [B] + \beta) \times t^{1/2} + \gamma \times [B] + \delta \quad (9)$$

The inventors of the present invention carried out numerical analysis by using a plurality of expressions which are obtained by substituting, in the above Expression (9), various results obtained as a result of producing, by using an Al-9% Si-2% Fe bath as the Al-based hot-dip coating bath, hot-dip aluminized steel sheets under respectively different conditions. As a result, the following were obtained as the coefficients: $\alpha=275.45$, $\beta=1.98$, $\gamma=-656.57$, and $\delta=-9.76$.

Note that the following can be said with regard to the above t. Assume that T (° C.) is the temperature of the Al-based hot-dip coating bath (bath temperature), and A (° C./second) is an average cooling rate in a time period from immediately after taking the molten coating material-coated steel sheet out of the hot-dip coating bath until completion of solidification of a molten coating material adhering to the substrate steel sheet. Then, in a case where the hot-dip coating bath is an Al-9% Si-2% Fe bath, the solidification temperature of the hot-dip coating bath can be defined as 577° C. As a result, t can be expressed as follows: $t=\{(T-577)/A\}$. Accordingly, the above Expression (9) can be rewritten as the following Expression (10):

$$YI=(\alpha \times [B]+\beta) \times \{(T-577)/A\}^{1/2}+\gamma \times [B]+\delta \qquad (10).$$

In a case where the yellowness index YI is more than 10, discoloration is visually noticeable. Therefore, the average cooling rate which prevents discoloration, that is, the average cooling rate A at which the yellowness index YI is not more than 10, can be expressed by the following Expression (11), by transforming the above Expression (10):

$$A \geq \{(\alpha \times [B]+\beta)/(10-\gamma \times [B]-\delta)\}^2 \times (T-577) \qquad (11).$$

(Generalization)

It is possible to prevent discoloration of a surface of a hot-dip coated steel sheet after hot-dip coating, in a case where the molten coating material-coated steel sheet is cooled at the average cooling rate A which has been determined according to the findings of the inventors of the present invention as described above. Further, according to the findings, the above Expression (10) can be generalized and expressed by the following Expression (12).

$$YI=(\alpha \times [SE]+\beta) \times \{(T-ST)/A\}^{1/2}+\gamma \times [SE]+\delta \qquad (12),$$

where:

[SE] is a concentration (mass %) of a specific element which is specified in advance among constituent elements of the hot-dip coating bath;

T is a temperature (° C.) of the hot-dip coating bath;

ST is a solidification temperature (° C.) at which the hot-dip coating bath is solidified;

A is the average cooling rate (° C./second); and $\alpha$, $\beta$, $\gamma$, and $\delta$ are the coefficients.

The specific element is an element, such as boron as described above, whose concentration of the hot-dip coating bath has a proportional relation to the yellowness index YI.

It is possible to obtain the coefficients $\alpha$, $\beta$, $\gamma$, and $\delta$ which are associated with a desired kind of hot-dip coating bath and the specific element, as described above, by using the Expression (12) for the desired kind of hot-dip coating bath. Then, it is possible to determine a cooling rate A which makes it possible to prevent discoloration of the surface of the hot-dip coated steel sheet, by using a mathematical expression obtained by substituting the coefficients in the above Expression (12).

3. Cooling Rate Determining Device in Accordance with One Embodiment

The following will discuss a cooling rate determining device in accordance with an embodiment of the present invention, with reference to FIG. 1. The cooling rate determining device determines, by using the above Expression (12), the average cooling rate A of the molten coating material-coated steel sheet. The molten coating material-coated steel sheet is a substrate steel sheet which is taken out of the hot-dip coating bath and to which a molten coating material adheres. FIG. 1 is a block diagram schematically illustrating a configuration of a cooling rate determining device in accordance with an embodiment of the present invention.

As illustrated in FIG. 1, a cooling rate determining device 1 includes a control section 10 and a storage section 20. The control section 10 includes a coefficient calculating section 11, a coefficient obtaining section 12, and a rate determining section 13. The storage section 20 stores therein condition data 21, experimental result data 22, and coefficient data 23.

The control section 10 controls an overall operation of the cooling rate determining device 1. The control section 10 is, for example, a central processing unit (CPU). Each section of the control section 10 can be realized as, for example, software which is executed by the CPU. The storage section 20 is a volatile or nonvolatile storage device (such as a hard disk or a flash memory), which stores therein various data used by the control section 10.

The condition data 21 is data concerning various conditions of hot-dip coating. The condition data 21 includes, for example, a basic composition of the hot-dip coating bath, a solidification temperature of the hot-dip coating bath, and the kind of the specific element.

The experimental result data 22 is data concerning experimental results obtained by producing, with use of a certain hot-dip coating bath, hot-dip coated steel sheets under respectively different conditions. The experimental result data 22 includes, for example, the average cooling rate A, the concentration of the specific element [SE], and the yellowness index YI.

The coefficient data 23 is data containing the coefficients $\alpha$, $\beta$, $\gamma$, and $\delta$ for use in the above Expression (12) in association with the basic composition of the hot-dip coating bath and the kind of the specific element. The coefficients contained in the coefficient data 23 are calculated by the coefficient calculating section 11.

In an embodiment of the present invention, first, the coefficient calculating section 11 calculates the coefficients $\alpha$, $\beta$, $\gamma$, and $\delta$ associated with the basic composition of the hot-dip coating bath employed and the kind of the specific element. Then, the coefficients thus calculated are stored as the coefficient data 23 in the storage section 20. Subsequently, the coefficient obtaining section 12 reads out the coefficient data 23 from the storage section 20 and sends the coefficient data 23 to the rate determining section 13. Thereafter, the rate determining section 13 determines the average cooling rate A, by using (i) a mathematical expression obtained by substituting, in the above Expression (12), the coefficients which are received from the coefficient obtaining section 12, and (ii) the concentration of the specific element, the temperature of the hot-dip coating bath, and a predetermined reference value of the yellowness index YI. The predetermined reference value of the yellowness index YI can be, for example, 10.

Note that processing by the coefficient calculating section 11 is not necessary, in a case where (i) the coefficients $\alpha$, $\beta$, $\gamma$, and $\delta$ associated with the basic composition of the hot-dip coating bath employed and the kind of the specific element have been calculated in the past and (ii) the coefficients $\alpha$, $\beta$, $\gamma$, and $\delta$ thus calculated have already been contained in the coefficient data 23. In this case, the coefficient obtaining section 12 can obtain the coefficients from the storage section 20.

(Hot-Dip Coating Bath and Specific Element)

The hot-dip coating bath can be any of various conventional hot-dip coating baths. The specific element is an element added to the hot-dip coating bath. The specific element is an element whose concentration of the hot-dip coating bath has a proportional relation to the yellowness index YI. For example, the hot-dip coating bath can be an Al-9% Si-2% Fe bath. In this case, the specific element can be boron. Such a specific element may exist for other kinds of hot-dip coating baths.

(Substrate Steel Sheet)

The substrate steel sheet can be selected from various kinds of steel depending on the use thereof, including some kinds of steel used in a base steel sheet to be coated to form a hot-dip coated steel sheet. For example, in the applications in which high corrosion resistance is considered important, a stainless steel sheet may be employed. The thickness of the substrate steel sheet is not limited, and can be, for example, 0.4 mm to 3.2 mm.

(Equipment)

An aspect of the present invention can be applied to continuous hot-dip coating equipment. Further, an aspect of the present invention can be also applied to immersion plating.

(Process flow)

The following will more specifically discuss a process carried out by the cooling rate determining device 1.

The coefficient calculating section 11 obtains as below the coefficients $\alpha$, $\beta$, $\gamma$, and $\delta$, as described earlier in "2. Schematic description of findings based on which present invention was made".

First, the coefficient calculating section 11 substitutes, in the Expression (12), (i) the solidification temperature ST which is determined in accordance with a kind of hot-dip coating bath (basic composition) employed and (ii) the average cooling rate A, the concentration of a specific element [SE], and the yellowness index YI which are obtained by producing, with use of the hot-dip coating bath, hot-dip coated steel sheets under respectively different conditions. The coefficient calculating section 11 here may read out the condition data 21 and the experimental result data 22 from the storage section 20, or alternatively may use data inputted via an input section (not illustrated). This gives a plurality of expressions (a system of equations) having the coefficients $\alpha$, $\beta$, $\gamma$, and $\delta$ as variables.

Next, the coefficient calculating section 11 carries out computation processing or numerical analysis for obtaining a solution to the system of equations by using the plurality of expressions thus obtained. This allows for calculation of the coefficients $\alpha$, $\beta$, $\gamma$, and $\delta$ associated with the kind of the hot-dip coating bath (basic composition) employed and the kind of the specific element. In view of, for example, an experimental error, it is preferable that the coefficient calculating section 11 calculate the coefficients $\alpha$, $\beta$, $\gamma$, and $\delta$ by numerical analysis. The coefficient calculating section 11 associates the coefficients $\alpha$, $\beta$, $\gamma$, and $\delta$ thus calculated, with the kind of the hot-dip coating bath (basic composition) and the kind of the specific element, and stores the coefficients $\alpha$, $\beta$, $\gamma$, and $\delta$ as the coefficient data 23 in the storage section 20.

The coefficient obtaining section 12 obtains, from the storage section 20, the coefficients $\alpha$, $\beta$, $\gamma$, and $\delta$ associated with the hot-dip coating bath employed (that is, the basic composition of the hot-dip coating bath and the kind of the specific element). For example, as described above, in a case where the hot-dip coating bath is an Al-9% Si-2% Fe bath and the specific element is boron, the following are obtained as the coefficients $\alpha$, $\beta$, $\gamma$, and $\delta$: $\alpha=275.45$, $\beta=1.98$, $\gamma=-656.57$, and $\delta=-9.76$.

Then, the rate determining section 13 determines the average cooling rate A such that the yellowness index YI is not more than a predetermined reference value in an expression that is obtained by substituting the above coefficients are substituted in the Expression (12). Note here that the average cooling rate A is a rate in a time period from immediately after taking the molten coating material-coated steel sheet out of the hot-dip coating bath until completion of solidification of a molten-metal coating material adhering to the substrate steel sheet.

This makes it possible to effectively prevent an increase in thickness of an oxide layer which is formed at a surface of a hot-dip coated steel sheet after hot-dip coating. Accordingly, it is possible to prevent discoloration of the surface of the hot-dip coated steel sheet. Further, determination of the average cooling rate A by use of the cooling rate determining device 1 makes it possible to obtain such a discoloration-preventing effect while preventing the average cooling rate A from becoming unnecessarily large.

Conventionally, it is possible to obtain an average cooling rate A which makes it possible to prevent discoloration of a surface of a hot-dip coated steel sheet by, for example, carrying out a preliminary experiment. However, in such a case, the preliminary experiment is needed every time a condition for hot-dip coating is changed. This is a heavy burden in production of hot-dip coated steel sheets. In contrast, in the case of the cooling rate determining device 1, the coefficients $\alpha$, $\beta$, $\gamma$, and $\delta$ are calculated in advance, and therefore, the cooling rate determining device 1 can quickly calculate, by using the Expression (12), the average cooling rate A associated with any of various hot-dip coating conditions.

EXAMPLE 1

Test samples were prepared by a double coating method. More specifically, as base steel sheets to be coated, Al—Si-based alloy coated steel sheets as shown in Table 1 below were used. Each of the base steel sheets was dipped in a hot-dip coating bath under conditions shown in Table 2 below. Then, a molten coating material-coated steel sheet was taken out of the hot-dip coating bath, and then subjected to air cooling or natural cooling in an air atmosphere. The test samples were thus prepared. The hot-dip coating bath used here was each Al-based hot-dip coating bath as shown in Table 3. The hot-dip coating bath used in Example 1 was an Al-9% Si-2% Fe bath. Accordingly, the coefficients $\alpha$, $\beta$, $\gamma$, and $\delta$ to be substituted in the Expression (12) were $\alpha=275.45$, $\beta=1.98$, $\gamma=-656.57$, and $\delta=-9.76$ described above.

TABLE 1

| | |
|---|---|
| Base steel sheet to be coated | hot-dip Al—9%Si coated steel sheet |
| Amount of coating material per surface | about 60 g/m² |
| Size | 200 mm × 70 mm |
| Thickness of sheet | 0.8 mm, 1.6 mm |

TABLE 2

| Period of dipping in coating bath | 40 sec. |
| --- | --- |
| Cooling atmosphere | atmospheric air |
| Amount of coating material per surface | about 120 g/m² |

In a case where the double coating method is used, a coating layer formed on the Al—Si-based alloy coated steel sheet prior to dipping in the coating bath dissolves during the dipping in the coating bath. On this account, the composition of the coating layer was substantially the same as that of the hot-dip coating bath, after a resultant coated steel sheet was taken out of the hot-dip coating bath.

In Example 1, the test samples prepared by the double coating method were evaluated with regard to the degree of discoloration (yellowness index YI). This is because there is a great difficulty in simultaneously carrying out gas reduction heating and cooling in an air atmosphere, in view of a structure of a testing device (coating test simulator manufactured by RHESCA Co., Ltd.).

The test samples obtained as above were investigated as follows.

The test samples were measured for respective yellowness indices YI, by using a spectrocolorimeter (manufactured by TOKYO DENSHOKU Co., Ltd.). Then, the degree of discoloration was evaluated with reference to the following criteria. The test samples evaluated as "Excellent" or "Good" were regarded as acceptable.

Excellent: YI value not more than 5;
Good: YI value not more than 10; and
Poor: YI more than 10.
Table 3 shows evaluation results together.

the present invention in which an actual average cooling rate A is not less than the cooling rate (discoloration-preventing cooling rate) obtained by using the Expression (12), the yellowness index YI of the surface of the hot-dip aluminized steel sheet is not more than 10. It follows that discoloration can be effectively prevented.

On the other hand, in Samples No. 13 to No. 16 and No. 19 of comparative examples in each of which the actual average cooling rate A was lower than the discoloration-preventing cooling rate, the yellowness index YI of the surface of the hot-dip aluminized steel sheet was more than 10 (that is, discoloration occurred).

Further, in Samples No. 17 and No. 18 of examples, although the yellowness index YI of the hot-dip aluminized steel sheet is not more than 10, the B concentration of the Al-based hot-dip coating bath is less than 0.001 mass %, which is a very low level. Accordingly, under hot-dip coating conditions of Samples No. 17 and No. 18 of those examples, discoloration hardly occurs in the first place. Therefore, these Samples No. 17 and No. 18 of the examples are included in comparative examples.

4. Another Aspect of Present Invention

The following description will discuss another aspect of the present invention. In the following description, although the matters described above will not be repeated for convenience of explanation, it is possible to similarly use, in the another aspect described below, the average cooling rate A which is determined by using the cooling rate determining device 1.

TABLE 3

| Sample type | No | Composition of coating bath (mass %) | | | | | Temperature of coating bath (° C.) | Actual average cooling rate (° C./s) | Discoloration-preventing cooling rate obtained from mathematical expression (° C./s) | Value of YI | Evaluation of appearance |
| --- | --- | --- | --- | --- | --- | --- | --- | --- | --- | --- | --- |
| | | Si | B | Ti | V | K | | | | | |
| Samples of examples of the present invention | 1 | 8.8 | 0.005 | 0.002 | 0.001 | <0.0001* | 660 | 11.6 | 1.8 | −2.12 | Excellent |
| | 2 | 8.8 | 0.005 | 0.002 | 0.001 | <0.0001* | 660 | 4.0 | 1.8 | −1.65 | Excellent |
| | 3 | 8.8 | 0.005 | 0.002 | 0.001 | <0.0001* | 660 | 2.0 | 1.8 | 8.56 | Good |
| | 4 | 8.7 | 0.010 | 0.001 | 0.002 | 0.0004 | 660 | 11.6 | 2.7 | −1.77 | Excellent |
| | 5 | 8.7 | 0.010 | 0.001 | 0.002 | 0.0004 | 660 | 4.0 | 2.7 | −0.79 | Excellent |
| | 6 | 9.2 | 0.015 | 0.002 | 0.004 | 0.0008 | 660 | 11.6 | 3.5 | −0.93 | Excellent |
| | 7 | 9.2 | 0.015 | 0.002 | 0.004 | 0.0008 | 660 | 4.0 | 3.5 | 9.88 | Good |
| | 8 | 9.1 | 0.020 | 0.002 | 0.002 | <0.0001* | 660 | 11.6 | 4.3 | −0.59 | Excellent |
| | 9 | 9.1 | 0.020 | 0.002 | 0.002 | <0.0001* | 680 | 6.2 | 4.3 | 3.05 | Excellent |
| | 10 | 9.1 | 0.020 | 0.002 | 0.002 | <0.0001* | 680 | 11.6 | 5.3 | −1.07 | Excellent |
| | 11 | 9.1 | 0.020 | 0.002 | 0.002 | <0.0001* | 660 | 6.2 | 5.3 | 9.50 | Good |
| | 12 | 9.5 | 0.035 | 0.014 | 0.015 | 0.0019 | 660 | 11.6 | 6.1 | 2.40 | Excellent |
| Samples of comparative examples | 13 | 8.7 | 0.010 | 0.001 | 0.002 | 0.0004 | 660 | <u>1.3</u> | 2.7 | <u>20.59</u> | Poor |
| | 14 | 9.2 | 1.015 | 0.002 | 0.004 | 0.0008 | 660 | <u>2.0</u> | 3.5 | <u>18.56</u> | Poor |
| | 15 | 9.1 | 0.020 | 0.002 | 0.002 | <0.0001* | 660 | <u>4.0</u> | 4.3 | <u>10.34</u> | Poor |
| | 16 | 9.1 | 0.020 | 0.002 | 0.002 | <0.0001* | 680 | <u>4.0</u> | 5.3 | <u>17.73</u> | Poor |
| | 17 | 9.0 | <u><0.001*</u> | 0.002 | 0.001 | <0.0001* | 660 | 11.6 | 1.0 | −2.15 | Excellent |
| | 18 | 9.1 | <u><0.001*</u> | 0.002 | 0.001 | <0.0001* | 660 | 1.3 | 1.0 | 7.92 | Good |
| | 19 | 9.5 | 0.035 | 0.014 | 0.015 | 0.0019 | 660 | 5.8 | 6.1 | <u>12.10</u> | Poor |

*B is below the detectable limit by ICP-AES, K is below the detectable limit by ICP-MS.

In this case, the lowest value of a range of average cooling rates obtained by using the Expression (12) is hereinafter referred to as a discoloration-preventing cooling rate. Further, the compositions of coating baths in Table 3 were obtained by ICP analysis (see Example 2 described later).

As is clear from Samples No. 1 to No. 12 of examples of the present invention shown in Table 3, in each example of The inventors of the present invention have found, as a result of attempting industrial production with use of the technique disclosed in Patent Literature 5, that the following phenomenon occurs in addition to the above-described phenomenon (discoloration).

That is, hot-dip aluminized steel sheets produced in different locations (coating lines) sometimes differ from each other in spangle density even in a case where the concentration of additive element(s) added to the coating bath, conditions for production in the equipment, and the like are the same. Therefore, when a hot-dip aluminized steel sheet is produced using a coating bath to which a combination of B and K falling within predetermined ranges of concentration has been added, the resulting hot-dip aluminized steel sheet does not always have a desired level of spangle density.

The inventors of the present invention determined the concentrations of elements contained in the Al-based hot-dip coating bath by inductively coupled plasma-atomic emission spectroscopy (ICP-AES). As a result, it was found that, for example, the B concentration sometimes differ from one region to another in the Al-based hot-dip coating bath within an aluminum pot, and the B concentration at the bottom of the Al-based hot-dip coating bath is sometimes relatively high. Further, the inventors of the present invention found that impurity concentrations in the Al-based hot-dip coating bath are not always the same in two or more pieces of coating equipment, and also found that among various impurities that are possibly contained in the Al-based hot-dip coating bath, particularly the Ti concentration and the V concentration significantly influence the spangle density of the resultant hot-dip aluminized steel sheet.

Unless intentionally added, most of Ti and V are impurities contained in an aluminum metal from which the Al-based hot-dip coating bath is prepared. Further, Ti and V bind to B in the Al-based hot-dip coating bath to form compounds such as $TiB_2$ and $VB_2$. The compounds such as $TiB_2$ and $VB_2$ precipitate at the bottom of the Al-based hot-dip coating bath, resulting in a reduction in B concentration of the resulting coating layer. The reduction in B contained in the coating layer decreases spangle nuclei which are produced when aluminum solidifies. This causes spangles to be larger in size. This results in a reduced spangle density. Meanwhile, the compounds such as $TiB_2$ and $VB_2$ act as solidification nuclei of spangles. Such action of these compounds is inferior to that of B alone or an aluminum boride.

Therefore, in order to stably obtain fine spangles regardless of coating equipment employed, the inventors of the present invention conceived the following two methods (i) and (ii). (i) Use a high-grade aluminum metal having low concentrations of Ti and V, for the Al-based hot-dip coating bath. (ii) Determine the amount of B to be added, in consideration of the amount of B consumed by Ti and V.

Then, the inventors of the present invention arrived at the hot-dip aluminized steel sheet in accordance with an aspect of the present invention and a method of producing the hot-dip aluminized steel sheet.

With regard to (i), if the amount of [Ti] and [V] in total is not more than 0.03 mass %, addition of not less than 0.005 mass % of [B] makes it possible to advantageously reduce the size of spangles to a minute size.

With regard to (ii), a ratio of the mass of B with respect to $TiB_2$ is 0.45, and a ratio of the mass of B with respect to $VB_2$ is 0.43. In light of this, in a case where the B concentration (mass %) of the Al-based hot-dip coating bath is arranged to be $[B] \geq 0.017 + 0.45 \times [Ti] + 0.43 \times [V]$, it is possible to obtain fine spangles whose density is not less than 500 per square centimeter.

The following will discuss a hot-dip aluminized steel sheet in accordance with an aspect of the present invention and a method of producing the hot-dip aluminized steel sheet.

(Hot-Dip Aluminized Steel Sheet)

Figure 2:
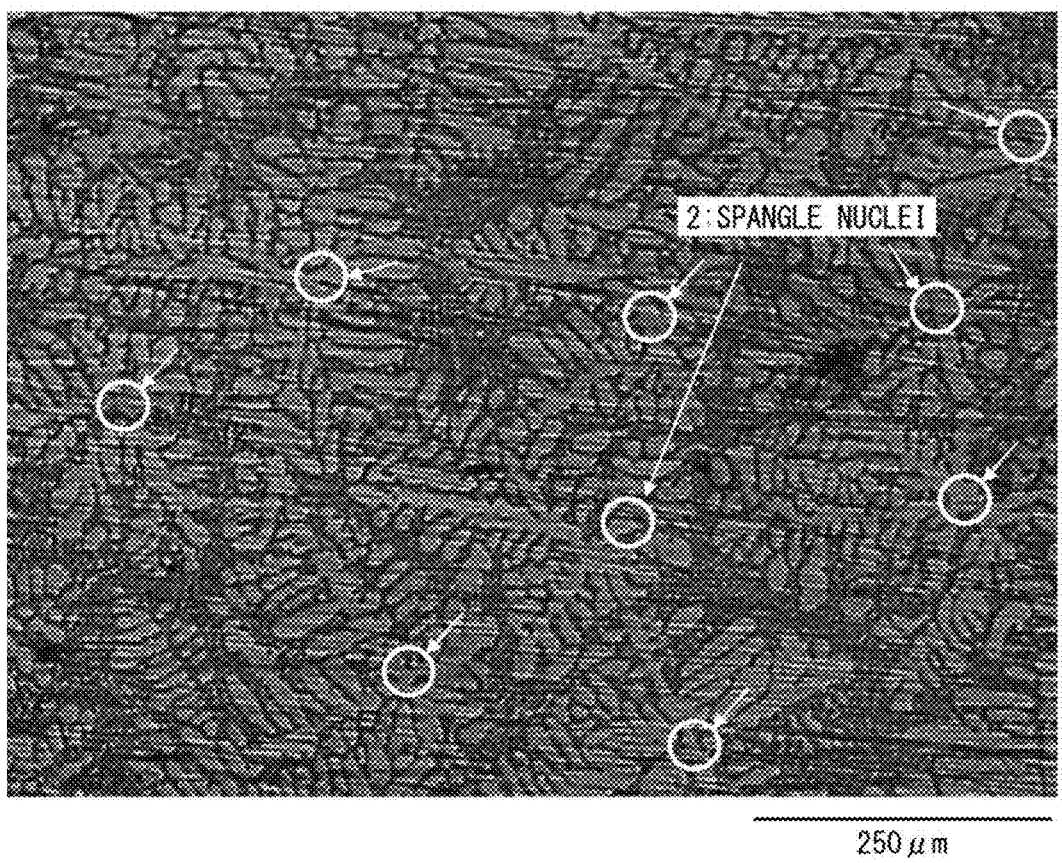
FIG. 2 is an optical photomicrograph of a state in which the outermost surface of a coating layer of a hot-dip aluminized steel sheet has been polished so that a dendrite structure is made observable.

FIG. 2 is an optical photomicrograph of a state in which the outermost surface of a coating layer of the hot-dip aluminized steel sheet according to the present embodiment has been polished so that a dendrite structure is made observable.

Schematically, the hot-dip aluminized steel sheet is produced by dipping and passing a substrate steel sheet in and through an Al-based hot-dip coating bath, which contains aluminum as a main component, so as to form an Al-based coating layer on a surface of the substrate steel sheet. On a surface of the Al-based coating layer, dendrites having grown from spangle crystal nuclei 2 are present (see FIG. 2). The density of the spangle crystal nuclei present on the surface of the Al-based coating will be discussed later.

(Substrate Steel Sheet)

The substrate steel sheet can be selected from various kinds of steel depending on the use thereof, including some kinds of steel conventionally used in base steel sheets to be coated to form hot-dip aluminized steel sheets. For example, in the applications in which high corrosion resistance is considered important, a stainless steel sheet may be employed. The thickness of the substrate steel sheet is not limited, and can be, for example, 0.4 mm to 3.2 mm.

(Al—Fe Alloy Layer)

An Al—Fe alloy layer also forms between (at a boundary between) a steel base material of the substrate steel sheet and the Al-based coating layer because of interdiffusion between Al and Fe.

The Al—Fe alloy layer is made mainly of an Al—Fe-based intermetallic compound. Note here that the Al-based hot-dip coating bath preferably contains silicon (Si). An Al—Fe-based alloy layer formed by passing through an Si-containing Al-based hot-dip coating bath contains a large amount of Si. Both an Si-free Al—Fe-based alloy layer and a so-called Al—Fe—Si-based alloy layer containing Si are herein collectively referred to as an Al—Fe-based alloy layer. In a case where the Al—Fe-based alloy layer, which is made of a brittle intermetallic compound, has a greater thickness, the coating layer is made less adhesive. This leads to inhibition of press workability. From the viewpoint of press workability, the Al—Fe-based alloy layer preferably has a thickness that is as small as possible. However, a technique of achieving a too large reduction in thickness of the Al—Fe-based alloy layer increases the process load, and such a technique is uneconomical. Generally, the Al—Fe-based alloy layer only needs to have an average thickness of not less than 0.5 μm.

(Composition of Al-Based Coating Layer)

The Al-based coating layer has a chemical composition that is substantially identical to the composition of the coating bath. The composition of the Al-based coating layer can thus be controlled by adjusting the composition of the coating bath.

The Al-based coating, which refers to a coating formed on the surface of the substrate steel sheet, encompasses the Al—Fe-based alloy layer. An aluminum oxide layer formed on the outermost surface of the hot-dip aluminized steel sheet causes no particular problem because the aluminum oxide layer is very thin. The aluminum oxide layer is therefore assumed to be encompassed in the Al-based coating. In a case where, for example, a film layer such as an organic film is further formed on the surface of the hot-dip aluminized steel sheet by a post treatment, such a film layer is, as a matter of course, not encompassed in the Al-based coating.

As such, the "average concentration" of a substance contained in the Al-based coating layer as used herein refers to an average of concentration distribution in the depth direction from the surface of the substrate steel sheet of the hot-dip aluminized steel sheet to the outer surface of the Al-based coating layer of the hot-dip aluminized steel sheet. Specifically, as described later, the average concentration is measured by carrying out concentration analysis with respect to a measurement solution in which the entire Al-based coating layer has been dissolved.

The concentrations of B, Ti, and V in the Al-based coating are each determined by averaging out the concentration distribution in the coating layer. Note here that B, Ti, and V in any form, e.g., compounds thereof, are included in the calculation of the concentration.

The Al-based coating layer of the hot-dip aluminized steel sheet in accordance with the present embodiment contains Al as a main component and contains at least B, and may optionally contain some other element.

Elements that can form a boride may reduce the effective B concentration and, in turn, may reduce the spangle-size-reducing effect. Therefore, it is preferable that the proportions of components of the Al-based coating layer are such that: Ti is 0 mass % to 0.02 mass %; V is 0 mass % to 0.02 mass %; Cr is 0 mass % to 0.2 mass %; Mn is 0 mass % to 0.01 mass %; and Zr is 0 mass % to 0.001 mass %.

In particular, the hot-dip aluminized steel sheet in accordance with the present embodiment is such that, because an Al-based hot-dip coating bath is initially made up of a high-purity Al metal, the sum of the Ti concentration and the V concentration of the Al-based coating is not more than 0.03 mass %. This increases the effective B concentration, resulting in a superior spangle-size-reducing effect.

It is more preferable that the sum of the Ti concentration and the V concentration is not more than 0.005 mass %. This enhances the spangle-size-reducing effect provided by B.

Si is an additive element that is effective for inhibition of growth of the Al—Fe alloy layer during solidification of molten Al. The Al-based hot-dip coating bath to which Si is added has a lower melting point. This is effective in reducing a temperature at which coating is carried out. In a case where the coating bath contains Si at a concentration of less than 1.0 mass %, the Al—Fe-based alloy layer is formed thick during hot-dip coating due to interdiffusion of Al and Fe. This causes peeling off of the coating layer during processing such as press forming. Meanwhile, in a case where the coating bath contains Si at a concentration of more than 12.0 mass %, the coating layer is cured. This makes it impossible to prevent cracking in a bent part of the coating layer and consequently causes the bent part to have lower corrosion resistance. Therefore, the coating bath preferably contains Si at a concentration of 1.0 mass % to 12.0 mass %. In particular, the coating bath which contains Si at a concentration of less than 3.0 mass % (i) allows an Si phase to be formed in a smaller amount during solidification of the coating and (ii) allows softening of a primary crystal Al phase. Such a coating bath is thus more effective in applications in which bending workability is considered important.

Furthermore, Fe, which comes from the substrate steel sheet and/or a constituent member(s) of a coating pot, is mixed into the Al-based hot-dip coating bath. Generally, the Al-based coating layer contains Fe at a concentration of not less than 0.05 mass %. Note that Fe is permitted to be contained in the Al-based coating layer at a concentration of up to 3.0 mass %, but more preferably not more than 2.5 mass %.

The hot-dip aluminized steel sheet may contain K. The K content of the coating bath is preferably not more than 0.03 mass %. If the K content of the coating is more than 0.03 mass %, the hot-dip aluminized steel sheet may become less resistant to corrosion.

Besides the above elements, an element(s), such as strontium (Sr), sodium (Na), calcium (Ca), antimony (Sb), phosphorus (P), and/or magnesium (Mg), may be intentionally added to the Al-based hot-dip coating bath as necessary, or the above element(s) coming from, for example, a raw material may be mixed in the Al-based hot-dip coating bath. The hot-dip aluminized steel sheet in accordance with the present embodiment can also contain such an element that has been conventionally generally accepted. Specifically, for example, a hot-dip aluminized steel sheet can contain Sr at a concentration falling within the range of 0 mass % to 0.2 mass %, Na at a concentration falling within the range of 0 mass % to 0.1 mass %, Ca at a concentration falling within the range of 0 mass % to 0.1 mass %, Sb at a concentration falling within the range of 0 mass % to 0.6 mass %, P at a concentration falling within the range of 0 mass % to 0.2 mass %, and/or Mg at a concentration falling within the range of 0 mass % to 5.0 mass %.

The balance of the Al-based hot-dip coating bath can be constituted by Al and unavoidable impurities.

A method of producing a hot-dip aluminized steel sheet in accordance with an aspect of the present invention can be organized as follows. Specifically, the method includes: a coating bath preparing step including preparing an Al-based hot-dip coating bath containing aluminum as a main component such that the Al-based hot-dip coating bath satisfies one or both of the following Expression (13) and Expression (14); and a coating step including dipping the substrate steel sheet in the Al-based hot-dip coating bath thus prepared and passing the substrate steel sheet through the Al-based hot-dip coating bath:

$$[B] \geq 0.005 \text{ and } [Ti]+[V] \leq 0.003 \quad (13), \text{ and}$$

$$[B] \geq 0.017+0.45\times[Ti]+0.42\times[V] \quad (14),$$

where:

[B] represents the B concentration (in mass %) of the Al-based hot-dip coating bath;

[Ti] represents the Ti concentration (in mass %) of the Al-based hot-dip coating bath; and

[V] represents the V concentration (in mass %) of the Al-based hot-dip coating bath.

Further, the coating bath preparing step of the present method includes adding a boron source to an aluminum bath liquid prepared from an aluminum metal such that a B concentration of the aluminum bath liquid at least satisfies one of the above Expressions (13) and (14).

It is preferable to use a high-grade aluminum metal as the boron source.

EXAMPLE 2

Hot-dip aluminized steel sheets (test samples) were produced as below in an experimental line with use of a coating test simulator manufactured by RHESCA Co., Ltd. by using, as a substrate steel sheet, a cold-rolled annealed steel sheet having a thickness of 0.8 mm and having the chemical composition shown in Table 4. Specifically, each hot-dip aluminized steel sheet was produced by (i) first subjecting the substrate steel sheet to hydrogen reduction heating, (ii) dipping the substrate steel sheet in an Al-based hot-dip coating bath prepared as described later, (iii) taking out the substrate steel sheet thus dipped, and (iv) solidifying a coating layer at a given cooling rate. The conditions in which the hot-dip aluminized steel sheets were produced are shown in Table 5.

TABLE 4

| Chemical composition (mass %) | | | | | | | |
|---|---|---|---|---|---|---|---|
| C | Si | Mn | P | S | Al | O | N |
| 0.033 | <0.01 | 0.23 | <0.01 | 0.013 | 0.01 | 0.0027 | 0.0025 |

TABLE 5

| | |
|---|---|
| Temperature of coating bath | 650° C. |
| Duration of dipping in coating bath | 2 sec. |
| Average cooling rate | 11° C./s |
| Amount of coating material per surface | about 80 g/m² |

The average cooling rate shown in Table 5 is within the average cooling rate A which is obtained by using the cooling rate determining device 1.

The components of each coating bath were adjusted in the following manner with use of aluminum metals A to G shown in Table 6 below. Molten Al was prepared mainly from aluminum metal A (high-purity Al metal) and aluminum metal B (Al-9% Si metal). The Si concentration was adjusted with use of aluminum metal C (Al-20% Si metal), and the B concentration was adjusted with use of aluminum metal D (Al-1% B metal) and E (Al-4% B metal). The Ti concentration was adjusted with use of aluminum metal F (Al-5% Ti metal), and the V concentration was adjusted with use of aluminum metal G (Al-5% V metal). The Fe concentration was adjusted with use of a cold-rolled steel sheet which is the same as the substrate steel sheet.

The composition of each coating bath was adjusted such that an Si concentration is 0 mass % to 15 mass %, an Fe concentration is 2.0 mass %, a B concentration is 0 mass % to 0.5 mass %, a Ti concentration is 0.0001 mass % to 0.1 mass %, and a V concentration is 0.0002 mass % to 0.1 mass %, with use of various proportions of aluminum metals A to G. Note that K is mixed in the coating bath because of the aluminum metals E to G.

was used as a solution for use in quantitative analysis of components in each coating bath. Thereafter, the solution for use in the quantitative analysis was subjected to the following two types of quantitative analysis, so that the composition of the components of the coating bath was found.

The quantitative analysis of Si, B, Fe, Ti, and V was carried out by an inductively coupled plasma atomic emission spectrometry method (ICP-AES method). The quantitative analysis of K was carried out by an inductively coupled plasma mass spectrometry method (ICP-MS method).

(Number of Spangle Crystal Nuclei on Surface of Coating)

A dendrite structure was made observable by buffing the surface of each test sample so as to make smoother the outermost surface layer extending from the surface of the coating layer to the depth of 5 μm. Then, the number of spangle crystal nuclei present per square centimeter of the surface of the coating layer was calculated with use of an optical microscope. The surface appearance was evaluated based on the following criteria, and the surface appearance evaluated as "Excellent" or "Good" was regarded as acceptable.

Excellent: Not less than 500 spangle crystal nuclei were present per square centimeter of the surface of the coating layer.

Good: Not less than 100 and less than 500 spangle crystal nuclei were present per square centimeter of the surface of the coating layer.

Poor: Not less than 50 and less than 100 spangle crystal nuclei were present per square centimeter of the surface of the coating layer.

Very Poor: Less than 50 spangle crystal nuclei were present per square centimeter of the surface of the coating layer.

(Corrosion Resistance of Coating Layer)

An untreated Al-based coating layer of each test sample was subjected to a neutral salt spray test (NSS test), specified

TABLE 6

| Base metal | Chemical composition (mass %) | | | | | | | | | |
|---|---|---|---|---|---|---|---|---|---|---|
| | B | Si | K | Ti | V | Cr | Mn | Fe | Zr | Al |
| Aluminum metal A | <0.001 | 0.043 | <0.001 | 0.003 | 0.005 | <0.001 | 0.001 | 0.12 | <0.001 | bal. |
| Aluminum metal B | <0.001 | 9.1 | <0.001 | 0.001 | 0.002 | <0.001 | 0.003 | 0.14 | <0.001 | bal. |
| Aluminum metal C | <0.001 | 20.1 | <0.001 | 0.002 | 0.001 | <0.001 | 0.004 | 0.13 | <0.001 | bal. |
| Aluminum metal D | 1.0 | 0.09 | 0.001 | 0.001 | 0.001 | <0.001 | 0.001 | 0.14 | <0.001 | bal. |
| Aluminum metal E | 4.2 | 0.13 | 0.19 | 0.12 | 0.006 | <0.001 | 0.001 | 0.14 | 0.001 | bal. |
| Aluminum metal F | <0.001 | 0.071 | 0.20 | 4.8 | 0.011 | 0.002 | 0.003 | 0.19 | <0.001 | bal. |
| Aluminum metal G | <0.001 | 0.12 | 0.11 | 0.010 | 4.9 | 0.003 | 0.003 | 0.16 | <0.001 | bal. |

The Al-based hot-dip coating bath obtained as above was subjected to the following investigation.

(ICP Analysis on Components in Coating Bath)

A solidified coating bath piece obtained by cooling and solidifying part of an Al-based hot-dip coating bath was dissolved in a mixed acid (a mixed solution of 40 ml of nitric acid and 10 ml of hydrochloric acid) while being heated, and then ultrapure water was added to a resultant solution so that the volume of the solution was adjusted to a volume of 250 ml. The solution which was obtained from the solidified coating bath piece and which had a volume thus adjusted by JIS Z2371:2000, and thereby the percentage of white rusted area was determined. Corrosion resistance of the coating was evaluated based on the following criteria, and the coating layer evaluated as "Good" was regarded as acceptable.

Good: The percentage of white rusted area was not less than 0% and less than 5%.

Poor: The percentage of white rusted area was not less than 5%.

Table 7 shows evaluation results.

TABLE 7

| Sampe type | No | \multicolumn{6}{c}{Amount of each component in coating bath (mass %)} | Spangle density (number of spangle crystal nuclei per cm$^2$) | Evaluation of surface appearance | Corrosion resistance |
|---|---|---|---|---|---|---|---|---|---|---|
| | | Si | B | K | Ti | V | Ti + V | | | |
| Samples of examples of the present invention | 21 | 8.8 | 0.005 | <0.00001* | 0.001 | 0.002 | 0.003 | 120 | Good | Good |
| | 22 | 0 | 0.01 | 0.0004 | 0.001 | 0.01 | 0.011 | 120 | Good | Good |
| | 23 | 8.7 | 0.008 | 0.0008 | 0.008 | 0.001 | 0.009 | 100 | Good | Good |
| | 24 | 0 | 0.009 | <0.00001* | 0.001 | 0.002 | 0.003 | 200 | Good | Good |
| | 25 | 2.0 | 0.015 | 0.0004 | 0.005 | 0.002 | 0.007 | 400 | Good | Good |
| | 26 | 9.0 | 0.017 | 0.002 | 0.002 | 0.001 | 0.003 | 700 | Excellent | Good |
| | 27 | 2.2 | 0.018 | 0.001 | 0.005 | 0.005 | 0.01 | 450 | Good | Good |
| | 28 | 0.5 | 0.02 | 0.0005 | 0.006 | 0.002 | 0.008 | 500 | Excellent | Good |
| | 29 | 5.0 | 0.02 | 0.0008 | 0.02 | 0.001 | 0.021 | 300 | Good | Good |
| | 30 | 9.1 | 0.021 | 0.0001 | 0.006 | 0.014 | 0.02 | 400 | Good | Good |
| | 31 | 9 | 0.022 | 0.035 | 0.001 | 0.001 | 0.002 | 900 | Excellent | Poor |
| | 32 | 2.5 | 0.022 | <0.00001* | 0.001 | 0.003 | 0.004 | 800 | Excellent | Good |
| | 33 | 9.2 | 0.023 | 0.0015 | 0.016 | 0.012 | 0.028 | 400 | Good | Good |
| | 34 | 9.2 | 0.026 | 0.0003 | 0.001 | 0.002 | 0.003 | 1100 | Excellent | Good |
| | 35 | 13.6 | 0.031 | 0.02 | 0.001 | 0.021 | 0.022 | 700 | Excellent | Good |
| | 36 | 9.2 | 0.032 | 0.05 | 0.01 | 0.015 | 0.025 | 1000 | Excellent | Poor |
| | 37 | 9.2 | 0.034 | 0.006 | 0.006 | 0.019 | 0.025 | 1500 | Excellent | Good |
| | 38 | 9.0 | 0.041 | 0.003 | 0.003 | 0.002 | 0.025 | 1800 | Excellent | Good |
| Samples of comparative examples | 39 | 0.5 | <0.001* | <0.0001* | 0.001 | 0.002 | 0.003 | 5 | Very poor | Good |
| | 40 | 12 | <0.001* | <0.0001* | 0.1 | 0.05 | 0.15 | 5 | Very poor | Good |
| | 41 | 5 | 0.002 | 0.0004 | 0.001 | 0.002 | 0.003 | 5 | Very poor | Good |
| | 42 | 9.2 | 0.002 | 0.0001 | 0.05 | 0.06 | 0.11 | 5 | Very poor | Good |
| | 43 | 9.5 | 0.01 | 0.0005 | 0.02 | 0.014 | 0.034 | 80 | Poor | Good |
| | 44 | 9.5 | 0.015 | 0.0001 | 0.015 | 0.023 | 0.038 | 70 | Poor | Good |
| | 45 | 8.8 | 0.017 | 0.0001 | 0.03 | 0.05 | 0.08 | 60 | Poor | Good |
| | 46 | 8.7 | 0.02 | 0.0003 | 0.05 | 0.006 | 0.056 | 80 | Poor | Good |
| | 47 | 9 | 0.022 | <0.0001* | 0.02 | 0.016 | 0.036 | 50 | Poor | Good |
| | 48 | 9 | 0.022 | 0.0008 | 0.02 | 0.05 | 0.07 | 50 | Poor | Good |
| | 49 | 8.9 | 0.028 | 0.0012 | 0.021 | 0.015 | 0.036 | 60 | Poor | Good |
| | 50 | 12.1 | 0.05 | 0.02 | 0.05 | 0.2 | 0.25 | 80 | Poor | Good |

*B is below the detectable limit by ICP-AES, K is below the detectable limit by ICP-MS.

As is clear from Samples No. 21 to No. 38 of examples of the present invention shown in Table 7, in the samples in each of which the proportions of components of the Al-based hot-dip coating bath fall within the ranges defined in an aspect of the present invention, the number of spangle crystal nuclei present per square centimeter of the surface of the coating layer (i.e., spangle density) is not less than 100. This reveals that the present invention makes it possible to obtain a hot-dip aluminized steel sheet which includes a coating layer having a surface on which fine spangles are stably and sufficiently formed and which has a beautiful surface appearance due to the fine spangles thus formed on the surface of the coating layer. Furthermore, provided that the sum of the average Ti concentration and the average V concentration of the coating bath is not more than 0.03 mass %, an increase in the average B concentration tends to cause an increase in the spangle density. Thus, by controlling the average B concentration of the coating bath, it becomes easy to control the spangle density and it is possible to reduce spangle size to a greater extent.

It is inferred that the reason why Sample No. 31 and Sample No. 36 had a white rusted area of 5% or greater in SST test is that the K concentration of the coating bath is high.

On the other hand, Samples No. 39 and No. 41 of comparative examples did not achieve a spangle-size-reducing effect, because, although the sum of the Ti concentration and the V concentration is not more than 0.03 mass %, the B concentration is less than 0.005 mass %.

Samples No. 40 and No. 42 of comparative examples did not achieve a spangle-size-reducing effect, because the sum of the Ti concentration and the V concentration is more than 0.03 mass % and the B concentration is less than 0.005 mass %. Samples No. 43 to No. 50 of comparative examples did not achieve a spangle-size-reducing effect because, although the B concentration is not less than 0.005 mass %, the sum of the Ti concentration and the V concentration is more than 0.03 mass %.

Note that, as is clear from Samples No. 21 to No. 50 shown in Table 7, the average concentration of Si contained in the coating bath does not particularly affect the effect of the present invention.

EXAMPLE 3

Cold-rolled annealed steel sheets 0.8 mm in thickness, each having the chemical composition shown in Table 4 in the foregoing Example 2, were used as substrate steel sheets, and hot-dip aluminized steel sheets (test samples) were prepared under the conditions shown in Table 5 in the foregoing Example 2.

The components of each coating bath were adjusted using aluminum metals A to G shown in Table 6 in the foregoing Example 2. The obtained hot-dip aluminized steel sheets were investigated in the same manner as described in the foregoing Example 2.

Table 8 shows investigation results.

TABLE 8

| Sample type | No | Amount of each component in coating bath (mass %) | | | | | | Spangle density (number of spangle crystal nuclei per cm$^2$) | Evaluation of surface appearance | Corrosion resistance |
|---|---|---|---|---|---|---|---|---|---|---|
| | | Si | B | K | Ti | V | Ti + V | | | |
| Samples of examples of the present invention | 61 | 0.5 | 0.02 | 0.0001 | 0.001 | 0.002 | 0.003 | 800 | Excellent | Good |
| | 62 | 9.0 | 0.025 | <0.0001* | 0.003 | 0.004 | 0.007 | 1100 | Excellent | Good |
| | 63 | 5.0 | 0.034 | 0.0004 | 0.02 | 0.005 | 0.025 | 1500 | Excellent | Good |
| | 64 | 8.6 | 0.038 | 0.0006 | 0.011 | 0.022 | 0.033 | 2000 | Excellent | Good |
| | 65 | 12.1 | 0.05 | 0.0002 | 0.02 | 0.045 | 0.065 | 1200 | Excellent | Good |
| | 66 | 9.1 | 0.05 | 0.0009 | 0.02 | 0.02 | 0.04 | 2100 | Excellent | Good |
| | 67 | 9.0 | 0.042 | 0.0003 | 0.006 | 0.031 | 0.037 | 2000 | Excellent | Good |
| | 68 | 8.8 | 0.044 | 0.005 | 0.04 | 0.006 | 0.046 | 1000 | Excellent | Good |
| | 69 | 9.1 | 0.048 | 0.012 | 0.019 | 0.016 | 0.035 | 2400 | Excellent | Good |
| | 70 | 11.9 | 0.38 | <0.0001* | 0.08 | 0.09 | 0.17 | 2500 | Excellent | Good |
| | 71 | 8.7 | 0.42 | 0.008 | 0.004 | 0.002 | 0.006 | 2200 | Excellent | Good |
| Samples of comparative examples | 72 | 9.1 | <0.001* | <0.0001* | 0.001 | 0.002 | 0.003 | 5 | Very poor | Good |
| | 73 | 9.0 | 0.002 | 0.0001 | 0.006 | 0.009 | 0.015 | 5 | Very poor | Good |
| | 74 | 5.0 | 0.005 | 0.0001 | 0.001 | 0.001 | 0.002 | 5 | Very poor | Good |
| | 75 | 0.5 | 0.008 | 0.0004 | 0.006 | 0.011 | 0.017 | 5 | Very poor | Good |
| | 76 | 8.7 | 0.017 | 0.0004 | 0.006 | 0.019 | 0.025 | 50 | Poor | Good |
| | 77 | 8.8 | 0.028 | <0.0001* | 0.04 | 0.005 | 0.045 | 120 | Good | Good |
| | 78 | 9.0 | 0.031 | <0.0001* | 0.01 | 0.05 | 0.06 | 100 | Good | Good |
| | 79 | 14.6 | 0.042 | 0.001 | 0.001 | 0.1 | 0.101 | 5 | Poor | Good |
| | 80 | 14.6 | 0.05 | 0.02 | 0.1 | 0.005 | 0.105 | 50 | Poor | Good |

*B is below the detectable limit by ICP-AES, K is below the detectable limit by ICP-MS.

As is clear from Samples No. 61 to No. 71 of examples of the present invention shown in Table 8, in the samples of examples in each of which the proportions of components of the coating bath fall within the ranges defined in an aspect of the present invention, the number of spangle crystal nuclei per square centimeter of the surface of the coating layer (i.e., spangle density) was not less than 500. This reveals that an aspect of the present invention makes it possible to obtain a hot-dip aluminized steel sheet which has fine spangles stably and sufficiently formed on the surface of a coating layer of that steel sheet and thus has a beautiful surface appearance. Meanwhile, as with the case with the foregoing Example 2, an increase in the average B concentration of the coating bath tends to cause an increase in the effective B concentration and in turn cause an increase in spangle density. Thus, by controlling the average B concentration of the coating bath, it becomes easy to control the spangle density and it becomes possible to reduce spangle size to a greater extent.

On the other hand, Samples No. 72 to No. 80 are comparative examples, and their B concentrations of coating baths do not satisfy the following Expression:

$$[B] \geq 0.017 + 0.45 \times [Ti] + 0.42 \times [V].$$

It follows that the spangle density was less than 500 per square centimeter. Note that Samples No. 31, No. 32, and No. 34 to No. 38 shown in Table 7 in the foregoing Example 2 also fall within the range of Example 3.

[Software Implementation Example]

Control blocks of the cooling rate determining device 1 (particularly, the control section 10) can be realized by a logic circuit (hardware) provided in an integrated circuit (IC chip) or the like or can be alternatively realized by software.

In the latter case, the cooling rate determining device 1 includes a computer that executes instructions of a program that is software realizing the foregoing functions. The computer, for example, includes at least one processor and a computer-readable storage medium storing the program. An object of the present invention can be achieved by the processor of the computer reading and executing the program stored in the storage medium. Examples of the processor encompass a central processing unit (CPU). Examples of the storage medium encompass a "non-transitory tangible medium" such as a read only memory (ROM), a tape, a disk, a card, a semiconductor memory, and a programmable logic circuit. The computer may further include a random access memory (RAM) or the like in which the program is loaded. The program can be made available to the computer via any transmission medium (such as a communication network or a broadcast wave) which allows the program to be transmitted. Note that an aspect of the present invention can also be achieved in the form of a computer data signal in which the program is embodied via electronic transmission and which is embedded in a carrier wave.

The present invention is not limited to the foregoing embodiments, but can be altered by a person skilled in the art within the scope of the claims. The present invention also encompasses, in its technical scope, any embodiment derived by combining technical means disclosed in the above description.

REFERENCE SIGNS LIST

1 cooling rate determining device
12 coefficient obtaining section
13 rate determining section

The invention claimed is:

1. A cooling rate determining device for determining a cooling rate of a molten coating material-coated steel sheet to prevent discoloration of surface of the hot-dip coated steel sheet, the molten coating material-coated steel sheet being a substrate steel sheet which is taken out of a hot-dip coating bath and to which a molten coating material adheres, the cooling rate determining device comprising:

a coefficient obtaining section configured to obtain coefficients α, β, γ, δ associated with the hot-dip coating bath, in the following Expression (1) which expresses a degree of discoloration YI of the surface of the hot-dip coated steel sheet obtained by cooling the molten coating material-coated steel sheet; and a rate determining section configured to determine an average cooling rate in a time period from immediately after taking the molten coating material-coated steel sheet out of the hot-dip coating bath until completion of solidification of the molten coating material adhering to the substrate steel sheet, the rate determining section determining the average cooling rate so as to allow the YI to be not more than a predetermined reference value, the YI being obtained by substituting the coefficients in the following Expression (1), $$YI=(\alpha \times [SE]+\beta) \times \{(T-ST)/A\}^{1/2} + \gamma \times [SE] + \delta \quad (1),$$

where:
[SE] is a concentration (mass %) of a specific element which is specified in advance among constituent elements of the hot-dip coating bath;
T is a temperature (° C.) of the hot-dip coating bath;
ST is a solidification temperature (° C.) at which the hot-dip coating bath is solidified;
A is the average cooling rate (° C./second); and
α, β, γ, δ are the coefficients
the rate determining section sending instructions to a hot-dip coating equipment to control the cooling of the molten coating material-coated steel sheet at the cooling rate equal to or higher than the determined average cooling rate to produce the hot-dip coated steel sheet.

2. The cooling rate determining device as set forth in claim 1, wherein:
the coefficients α, β, γ, δ are coefficients in the following Expression (2) and Expression (3):

$$X_1(t) = \alpha \times t^{1/2} + \gamma \quad (2); \text{ and}$$

$$X_2(t) = \beta \times t^{1/2} + \delta \quad (3),$$

where:
t is a time taken to solidify, in an air atmosphere, the molten coating material adhering to the substrate steel sheet; and
$X_1(t)$ and $X_2(t)$ are each a function of t in the following Expression (4):

$$YI = X_1(t) \times [SE] + X_2(t) \quad (4).$$

3. The cooling rate determining device as set forth in claim 2, wherein:
the coefficients α, β, γ, δ are obtained by numerical analysis with use of the plurality of expressions which are obtained by substituting the following (i) and (ii) in the Expression (1):
(i) the solidification temperature ST determined by the hot-dip coating bath which is used; and
(ii) the average cooling rate A, the concentration of the specific element [SE], and the yellowness index YI which are obtained by producing, under different conditions, the hot-dip coated steel sheet with use of the hot-dip coating bath.

4. The cooling rate determining device as set forth in claim 1, wherein:
the coefficients are α=275.45, β=1.98, γ=−656.57, and δ=−9.76.

5. The cooling rate determining device as set forth in claim 4, wherein:
the hot-dip coating bath is an Al-9% Si-2% Fe bath;
the specific element is boron;
the solidification temperature ST, at which the hot-dip coating bath is solidified, is 577° C.; and the predetermined reference value is 10.

6. A non-transitory computer-readable storage medium storing an information program for causing a computer to function as the cooling rate determining device recited in claim 1.

* * * * *